United States Patent
Grezeszak

Patent Number: 6,132,118
Date of Patent: Oct. 17, 2000

[54] CURVED MOUND ERGONOMIC KEYBOARD

[76] Inventor: Lori Grezeszak, 3680 Dill Dr., West Branch, Mich. 48661

[21] Appl. No.: 09/290,145

[22] Filed: Apr. 13, 1999

[51] Int. Cl.7 ................................................. B41J 5/10
[52] U.S. Cl. ......................... 400/489; 400/472; 400/486
[58] Field of Search .................................. 400/489, 486, 400/485, 488, 472; 341/22; 345/168; 361/680

[56] References Cited

U.S. PATENT DOCUMENTS

| | | | |
|---|---|---|---|
| D. 323,817 | 2/1992 | Buchin | 400/489 X |
| D. 362,432 | 9/1995 | Paull | 400/489 X |
| D. 362,434 | 9/1995 | Abell | 400/472 X |
| 4,597,681 | 7/1986 | Hodges | 400/488 |
| 4,661,005 | 4/1987 | Lahr | 400/489 |
| 5,029,260 | 7/1991 | Rollason | 400/489 X |
| 5,129,747 | 7/1992 | Hutchison | 400/489 |
| 5,137,384 | 8/1992 | Spencer | 400/489 |
| 5,156,475 | 10/1992 | Zilberman | 400/472 |
| 5,339,097 | 8/1994 | Grant | 345/168 |
| 5,360,280 | 11/1994 | Camacho | 400/489 |
| 5,424,728 | 6/1995 | Goldstein | 341/22 |
| 5,426,449 | 6/1995 | Danziger | 345/168 |
| 5,576,733 | 11/1996 | Lo | 400/489 X |
| 5,612,691 | 3/1997 | Murmann | 341/22 |
| 5,620,267 | 4/1997 | Klauber | 400/486 |
| 5,660,488 | 8/1997 | Miller | 400/486 |
| 5,689,253 | 11/1997 | Hargreaves | 341/22 |
| 5,711,624 | 1/1998 | Klauber | 400/486 |
| 5,716,149 | 2/1998 | Mensick | 400/489 |
| 5,731,808 | 3/1998 | Gaither | 400/489 X |
| 5,767,463 | 6/1998 | Gandre | 400/490 X |
| 5,775,822 | 7/1998 | Cheng | 400/489 |
| 5,874,906 | 2/1999 | Willner et al. | 400/489 X |
| 5,892,499 | 4/1999 | Vulk, Jr. | 400/489 X |

*Primary Examiner*—John S. Hilten
*Assistant Examiner*—Minh Chau

[57] ABSTRACT

An ergonomic keyboard where the preferred embodiment is mound shaped and curved toward the operator. The left and right sides (36, 36') angle down and flatten out to form a hand rest area (80, 80'), allowing the hands (20, 20') to rest on the padded portion opposite the thumb. When in this position, the hands of the operator will clutch the mound shape, with fingers reaching to the back to activate alphabetic (72, 58) and numeric keys (78, 64) arranged in QWERTY format. The thumbs (38, 38') rest over spacing keys (84, 84') on the front face (22). A mouse control (44), lesser-used function keys, direction keys (42), and other symbols, are arranged conveniently on the front face (22), in view of the operator. The keyboard can be conveniently used on the operator's lap or on a desktop. The resulting natural and relaxed position of the fingers, wrists (34, 34'), arms (12, 12'), and shoulders (14), reduces the likelihood of carpal tunnel syndrome or other repetitive stress injuries.

5 Claims, 8 Drawing Sheets

(Prior Art)

CURVED MOUND ERGONOMIC KEYBOARD

BACKGROUND

1. Field of Invention

This invention relates generally to keyboards and more particularly to ergonomically designed keyboards for use with computers and other electronic data input devices.

2. Discussion of Prior Art (Introduction) When keyboards were originally invented, placement of keys was directly on the front of the device. This was necessary so that fingers could strike with enough force to have levers hit the paper, resulting in printed letters on the page. The design of the machine was controlled by the mechanics necessary to make it work. When electric typewriters came about, the needed force on the keys was tremendously decreased. However, the basic keyboard format and positions of the keys has remained similar to the early formats.

Many problems have risen from the unnatural position of the shoulders, forearms, wrists, and fingers while making repetitive motions to operate the keyboard. In more recent years, computers with electronic keyboards have become commonplace in homes, schools, and businesses. With dramatically increased use has come dramatically increased cases of repetitive stress injuries. In fact, carpal tunnel syndrome (CTS) and other cumulative trauma disorders are the fastest growing category of occupational injuries in the United States. "It (CTS) is now recognized to afflict nearly two million workers . . . and with millions of schoolchildren growing up using computers, more and more jobs being done on computers, millions of adults abandoning the United States mail for E-mail, and growing numbers of people signing on to the Internet every day, there is a pressing need for preventive attention and simpler correctives."[1] (Copies of all footnote references can be found in Appendix A).

[1]Brody, Jane E., "Personal Health," *New York Times*, Feb. 28, 1996, p. C9.

From 1983 to 1987, job-related cumulative trauma disorders tripled. By the year 2,000, an estimated 50 percent of the work force could suffer from these repetitive stress injuries (RSIs), according to the National Institute of Occupational Safety and Health. It has become an expensive condition troublesome for both the employee and industry.[2] According to *Design News* magazine, "Many employees suffer from Carpal Tunnel Syndrome, the nation's leading cause of occupational illness, and the second most common cause of operations. The cost to employees: more than $27 billion a year.[3] In fact, there have been law suits in more recent years surrounding CTS. In December of 1996, a federal jury in Brooklyn awarded nearly $6 million to three women who sustained arm, wrist, and hand injuries while using keyboards made by the Digital Equipment Corporation.[4]

[2]Johnson, Elaine, "Is There a Cure for Carpal Tunnel Syndrome?," *Safety and Health*, February, 1994, p. 34.
[3]"Work Envelope Tackles Carpal Tunnel Syndrome," *Design News*, Nov. 1, 1993, p. 44.
[4]"Big Jury Award in Injury Case Over Keyboards," *New York Times*, Dec. 10, 1996, p. D1.

(Identification of Problem Areas) CTS is caused by compression of the median nerve at the wrist within the carpal tunnel.[5] The cause of carpal tunnel syndrome in relation to frequent use of a conventional keyboard can be broken down into three problem areas, (1) the wrists, (2) the fingers, and (3) the forearms. Besides CTS, other repetitive stress injuries can show up in (4) the shoulder and neck area.

[5]Steyers, Curtis M., MD, "Practical Management of CTS," *The Physical and Sportsmedicine*, Vol. 23, January, 1995, p. 84.

(Problem Areas—(1) Wrists) The most obvious problem is the wrists. With the conventional keyboard, the operator must both pronate his/her wrists to a horizontal plane and angle them inward with palms down and fingers aligned with the straight rows of keys. When operating outside of their natural and ideal range, tendons and nerves are adversely affected, and over time, can lead to CTS. Also, when the operator instinctively rests his/her arms due to lapses in his/her work, or fatigue, he/she will rest them directly on the wrist, further putting pressure on the median nerve.

(Problem Areas—(2) Fingers) Secondly, the finger placement and movement play an important role. With the straight lines of keys on a conventional keyboard, the varying length of fingers is not taken into consideration. Longer fingers are caused to be held in an arch, while shorter fingers lie flatter and even require the operator to move the entire arm forward or backward to reach keys on the upper and lower rows. In a natural position, the fingertips form a curve shape. But they are forced into a straight line or rows on the conventional keyboard.

The pinky fingers are used to reach many frequently-used keys such as the backspace, escape, control key, and alt key. This creates excessive sideways twisting movements of the wrists.

Also, the natural pushing motion for the fingertips is at an angle downward and inward toward the operator. However, the conventional keyboard requires a straight downward motion on the home keys, the downward/inward motion for the closest row of keys, and the opposite motion, upward/outward, for a majority of the keys, those above the home row. Not only do the unnatural motions cause stress on the muscles and tendons, but the constant changing of directions of motion causes additional stress.

(Problem Area—(3) Forearms) The third area affecting CTS is the position of the forearms. With the conventional keyboard, the arms may be held even with or higher than the elbows. This creates considerable strain when an operator must use the keyboard for long periods of time. If the hands are held lower than the elbows, such as putting the keyboard on the lap, muscles on the top of the forearm must work harder to keep the fingers raised up into position. Again, the tendency is for the operator to rest his/her wrists, causing pressure on the carpal tunnel.

(Problem Area—(4) Shoulders/Neck) Besides CTS, other RSIs can arise from the unnatural position of the shoulder joints. While using a conventional keyboard, they are rotated slightly forward and often bear the weight of the arms for long periods of time. The natural position of the shoulders is when the elbows are down by the operator's sides. Muscle strain in the shoulders/neck area and subsequent headaches can be caused by the unnatural forward and inward rotated position of the shoulders necessary for the operation of the conventional keyboard.

(Introduction to Prior Art) When key mechanisms advanced from mechanical to electronic, the shape of the keyboard could be made to fit the operator's needs, instead of being dictated by the mechanics of the device. A number of prior art keyboard designs have been proposed to improve one or more of the factors contributing to CTS and other repetitive stress injuries. (Copies of all prior art referenced can be found in Appendix B).

(Prior Art—Wrists) Many designs proposed separating the keyboard into left-hand and right-hand components. For example, FIG. 3 of U.S. Pat. No. 4,661,005, by Lahr, (issued Apr. 28, 1987) shows a keyboard which slides apart from the middle, causing the hands to separate, thus straightening the inward angle of the wrists. Other methods for straightening the wrists involved simply splitting the keyboard between the left-hand and right-hand keys, and angling the edge of the keyboard next to the operator at an outward angle. This can be seen in U.S. Pat. No. 362,434 (FIG. 8) by Abell et al. (issued Sep. 19, 1995), U.S. Pat. No. 5,424,728 (FIG. 1) by Goldstein (issued Jun. 13, 1995), and U.S. Pat. No. 5,612,691 (FIG. 2) by Murmann and Frank (issued Mar. 18, 1997). This same idea is shown in U.S. Pat. No. 5,129,747 (FIG. 1) by Hutchison (issued Jul. 14, 1992), which angles the keyboard into a V shape or chevron design to allow for straightening of the inward wrist angle. Similarly, a rounded V or wave shape has been proposed as illustrated by U.S. Pat. No. 5,360,280 (FIG. 1) issued to Camacho and Granadino (Nov. 1, 1994). These inventions, however, provide only a partial solution and do not correct the many other factors contributing to the repetitive stress injuries with keyboard use.

One of these other factors is the twisting of the wrists into a horizontal planar, unnatural position (pronation). Rollason, U.S. Pat. No. 5,029,260 (FIG. 1) (issued Jul. 2, 1991), proposed a keyboard which forms a large arch, allowing the hands to tilt slightly outward. Other designs proposed keyboards higher in the middle than on the left and right ends, as shown in U.S. Pat. No. 5,339,097 by Grant (issued Aug. 16, 1994), and U.S. Pat. No. 323,817 by Buchin (issued Feb. 11, 1992).

U.S. Pat. No. 362,432 (FIGS. 2,3) by Paull et al. (issued Sep. 19, 1995), combines attempts to correct both the inward angle and pronation problems of the wrists by providing a wave shape housing which is also raised in the middle between the hands. This design, however, lends itself to having the operator rest his/her wrists directly on the keyboard housing, which puts pressure on the carpal tunnel, and therefore on the median nerve, increasing the likelihood of injury.

U.S. Pat. No. 5,137,384 (FIG. 1) to Spencer and Albert (issued Aug. 11, 1992), sets up two completely vertical keyboard halves, allowing the weight of the extended hand/forearm to be borne comfortably on the narrow side of the hand opposite the thumb, but overcorrects the pronation past the natural wrist position.

Spencer's device also neglects the natural grasping and striking force of the fingers. By mounting the keys to face left and right, the user's fingers are forced to strike in an unnatural direction. Also, the flat keyboard surface causes extra strain on the user's fingers because a flat surface does not accommodate for differences in finger length. To help overcome this problem, the user would tend to tip his/her fingers outward and wrists inward so that the tips of the fingers are even, or may continually adjust the position of the wrist during data entry to accommodate for short and long fingers. Both of these scenarios would further increase strain on the wrist, forearms, and tendons of the fingers because of the unnatural angle created at the wrist between the top of the hand and the forearm.

Like Spencer, Mohler, U.S. Pat. No. 5,160,919 issued November 1992, presented a vertical keyboard. The keys are on opposite sides of a vertical base, with "palms facing each other." Again, this design does not correct the problem of the user's fingers being required to strike in an unnatural direction, nor does it accommodate for differences in finger length. In another embodiment of Mohler's invention, the edge of the keyboard areas farthest away from the user is made to angle outward so that the keys are visible (described in Col. 4, lines 25–28). This creates a problem at the wrist by causing an angle between the top of the hand and the forearm, therefore putting great strain on the wrists, forearms, and tendons of the fingers during data entry.

Lo provides for the vertical formation ("upright stack") of the operator's fingers on a mouse device (U.S. Pat. No. 5,576,733) in order to correct problems associated with the wrist. His design, however, applies only to the use of a mouse and requires that the weight of the hand, forearm, and the device, repetitively be borne by the arms and shoulders when the operator picks up and moves the mouse, as is frequently necessary during its use.

Danziger, U.S. Pat. No. 5,426,449 (issued Jun. 20, 1995) attacks the same wrist deviations with his "pyramid shaped ergonomic keyboard," (FIG. 1) and also provides attachable devices for the resting of the hands and arms (FIGS. 7a and 7b). However, there are a number of flaws with Danziger's design. The housing unit is of a complex nature, being split into three sections, with adjustable left and right sides of the pyramid (FIGS. 3, 3a, 5b, 5c), flip-out hand rests (FIG. 3), and bulky arm attachments (FIGS. 7a, 7b). This makes it impractical for convenient individual use or for business to manufacture. The placement of the often-used backspace key is not in the usual position as that of a conventional keyboard (FIG. 4a). Also, the function keys on the front, center portion are not in the same general configuration or placement as that on a conventional keyboard (FIG. 4a). Ample relearning time would be needed for the operator to become familiar with the new placement of many keys. While the structure does provide for a more natural wrist position, the concave nature of the two side panels of keys (FIG. 2) requires that the fingers be raised even higher than that of a conventional keyboard to make reaches both up and down from the home row of keys. This causes repeated strain on the flexor and extensor tendons of the fingers.

(Prior Art—Fingers) Other keyboard inventors have also proposed concave keypad structures, possibly in an attempt to accommodate the differences in the lengths of the fingers. This is shown in U.S. Pat. No. 4,597,681 (FIG. 1) by Hodges (issued Jul. 1, 1986), U.S. Pat. No. 5,731,808 (FIG. 1) by Gaither (issued Mar. 24, 1998), U.S. Pat. No. 5,689,253 (FIG. 1) by Hargreaves and Lunde (issued Nov. 18, 1997), and U.S. Pat. No. 5,775,822 (FIG. 2) by Cheng (issued Jul. 7, 1998). Again, this concave design requires extra, unnatural movement of the fingers.

FIG. 2 of Mensick's "Ergonomically Improved Standard Keyboard," (U.S. Pat. No. 5,716,149, issued Feb. 10, 1998) shows the keyboard plane flat rather than concave, and keys somewhat staggered out of the normal horizontal rows " . . . based upon consideration of the relative positions of the bases of the fingers . . . and the natural orientation of the fingertips." Similarly, as shown in FIG. 4 of Miller's U.S. Pat. No. 5,660,488 (issued Aug. 26, 1997) a flat planar surface is used for the keys, but each row arches to fit the curve formed by the fingertips when held in a natural position.

As stated earlier, overuse and twisting wrist motions come from the pinky fingers being used for many frequently-used keys. This has caused keyboard inventors to give these reaches to other fingers. This can be seen in U.S. Pat. No. 5,156,475 (FIG. 5) by Zilberman (issued Oct. 20, 1992) which shows an inverted T-shape key in the middle of the keyboard that includes the enter function, Danziger's design discussed earlier (U.S. Pat. No. 5,426,449 issued Jun. 20, 1995) which provides an entire front thumb panel (FIG. 3), U.S. Pat. No. 5,711,624 (FIG. 2) (issued Jan. 27, 1998) by Klauber and U.S. Pat. No. 5,620,267 (FIG. 2) also by Klauber (issued Apr. 15, 1997), which provide for a thumb-activated backspace/erase key located on the left half of the conventional spacebar, and a thumb-activated control key.

Only Gandre (U.S. Pat. No. 5,767,463 issued Jun. 16, 1998) has recognized that the force of the fingertips, when held in a natural position, is downward and inward, toward the operator. FIG. 5 of his design shows a front-facing keyboard which has rows of keys each individually angled at a 45° slant away from the user (FIG. 4), coming up from the support base. When struck, the keys slide downward and inward toward the user. His design, however, does not provide for wrist and forearm correction, nor does it correct reaches to allow for any differences in finger lengths or curvature.

(Prior Art—Forearms) Fifteen of the thirty-five muscles which move the hand are in the forearm rather than the hand itself.[6] Therefore, it is very important that any ergonomic keyboard correct for muscle and tendon strain in this area. Most previous inventions have failed to correct the strain on the flexor and extensor tendons associated with the forearm because the fingers are held even with or above the horizontal plane of the forearms, and then must be picked up to make reaches above the home row. The inclination of the keyboard operator to help relieve this stress is to rest the keyboard on his/her lap. Rollason's arching convex curved surface keyboard design described earlier (U.S. Pat. No. 5,029,260 issued Jul. 2, 1991) provides for a support to position the structure over the operator's legs on his/her lap (FIG. 2). However, his correction of the pronation problem is offset by the creation of a new problem when the keyboard is put on the lap, namely the additional stress put on the wrist when the forearm angles down and the wrist angles up. Danziger's design, also discussed earlier, (U.S. Pat. No. 5,426,449 issued Jun. 20, 1995) mentions that "the pyramid-shaped keyboard may be used while resting in the lap of the operator." As with Rollason's, this design doesn't allow for the new angle created with the forearm and wrist, when the device is rested on the lap.

[6]"Hand," *The World Book Encyclopedia*, 1990, Vol. H, p. 39.

Vulk's patent (U.S. Pat. No. 5,892,499 issued April 1999) focuses on correcting the problem of strain on the wrists and forearms. He proposes a palm and forearm support device which basically eliminates the angle created between the forearm and top of the hand. However, his device provides only a partial solution because the top of the operator's wrists are forced to face up, unnaturally rotating them into a horizontal plane or pronated position (FIGS. 5, 10, 15, 20, 21, 23, 27, and 31).

(Prior Art—Neck/Shoulders) Keyboards which split the left-hand and right-hand sections and place them at shoulder width, promote a more natural position and thus less shoulder and neck strain. Keyboards designed for use on the operator's lap have promoted a much more natural arm and shoulder position, but previous designs have not taken into consideration the new downward angle created and where the weight of the arms will rest.

Neck strain can be caused by a repetitive motion of the operator to look up and down. As angles of the keys or sections of the keys have been changed in many ways to accommodate natural motion, designers have struggled with ways for the operator to still view the keys. Spencer, for example (U.S. Pat. No. 5,137,384 issued Aug. 11, 1992 and discussed earlier), devised angled mirrors for the operator to read the keys (FIG. 5). However, repetitive stress injuries strike mainly those who have been taught and consistently use the touch method for typing (striking keys from the memorized reach of fingers without looking for them). For that reason, it is not necessary for keyboards which are designed for preventing RSIs to allow full view of the frequently-used keys. In fact, when the keys are in full view, a person learning the most efficient way to use a keyboard (the touch method), finds it very difficult to learn not to consistently look down for the keys. If this habit is created, it promotes a much greater risk of muscle strain and injury to the neck and shoulders.

(Prior Art—Conclusion) While many previously-proposed keyboards may improve one or more problem areas, none is comprehensive enough to improve all of them at once. Therefore, it is most desirable to provide a keyboard which takes into account all of the above-mentioned repetitive motion problem areas. Furthermore, there remains a need in the art for a keyboard which minimizes the strain and injuries to the operator without him/her having to undergo extensive retraining.

OBJECTS AND ADVANTAGES

Accordingly, an object of the present invention is to provide a keyboard shaped to fit the most natural, relaxed position of the hands, wrists, fingers, arms, and shoulders without being dictated by previous keyboard shapes. The resulting keyboard design encompasses all previous problem areas worked on with the prior art in order to minimize repetitive stress injuries to its user. The present design allows the wrists to be in straight alignment with the forearms, not angled in such as is necessary with the use of conventional keyboards. The inside edges of the wrists are also angled up so as to have the thumbs up, eliminating the pronation problems contributing to CTS. Another advantage created by the current keyboard design is that the fingers will not have to be picked up higher than the plane of the forearms to make above-home-row reaches. Therefore, strain on the flexor and extensor tendons associated with the forearm will be minimized. A further advantage is that the hands and arms will be shoulder-distance apart, thus minimizing any shoulder strain and resulting neck strain (which is often a problem caused by the shoulder joints being held forward and angled in for conventional keyboard use).

An object of the current invention is to provide a keyboard design and configuration which follows the QWERTY typing format for letters, numbers, and other often-used symbols and functions (tab, backspace, etc.), and which requires no relearning of basic keyboarding techniques for the operator.

An object of the current invention is to provide a keyboard which does not require the weight of the arms and hands to be held up by the shoulders for long periods of time. The current invention is intended for optimal use on the lap and provides for the weight of the arms and hands down toward the lap of the operator. With the weight of the arms and hands resting during operation, the work of the shoulder, neck, and forearm muscles is decreased, reducing RSIs. With the current invention, the weight of the arms and hands falls on the small, padded portion of the hand opposite the thumb, thus eliminating any problems of the weight resting on the wrists, as caused by conventional keyboards. (This is the same place the weight of the arm and hand falls when doing conventional writing with a pen or pencil.) An ensuing advantage of the current invention's shape is that the natural clutching position of the hands during operation will prevent the keyboard from accidentally falling off of the operator's lap. Also, a keyboard designed for optimal use on the lap lends itself well to the newest method of creating wireless keyboards, not putting damaging tension on a cord running from the keyboard to the main unit.

It is an object of the current invention to provide a simple keyboard shape which is easy for business to manufacture and convenient for the operator to use. The current proposed keyboard unit provides ergonomic advantages with curved shapes, key placements and key designs, and has no moving, adjustable, or attachable parts.

It is an object of the current invention to provide the most natural position for the striking force of the fingertips and thumb. With the letter keys positioned on the back of the keyboard unit, the most natural direction for the striking force is used, and the changes in direction of motion for key reaches are minimized. Also, with the thumb on the front side of the keyboard unit, the most natural striking force is in a clutching movement away from the user, so the space bars are on each side, directly under the thumb. A resulting advantage of this object is that the placement of the often-used keys on the back of the unit puts them out of direct sight of the user, thus promoting the most efficient intended use of the keyboard, namely, the use of the touch method. Young people or others learning the touch method using the proposed keyboard will find it very difficult to learn the method improperly. The use of the touch method eliminates unnecessary head and neck motion which can cause injury. This keyboard design facilitates those who use the keyboard the most, and therefore are more likely to have mastered the touch method. These are the people who are at greatest risk of developing CTS and other RSIs.

It is an objective of this invention to accommodate for differences in finger length and the natural arch formed by the fingertips. The curved placement of the keys minimizes the distances the fingers have to reach and makes all letter reaches approximately equal.

It is an object of the present invention to provide a separate keypad with the same ergonomic advantages as the keyboard for using numbers with the keypad touch method.

It is an object of the current invention to provide a keyboard structure which could easily be adaptable to current methods of creating electronic "connections" inside the keyboard.

An object of the current invention is to provide a keyboard in which the keys for the lesser-used keyboard functions (those with reaches not typically memorized) are put in good viewing position, are arranged attractively, and follow the same general configuration as that of the conventional keyboard. These keys include the arrows, function keys (e.g. F1, F2), miscellaneous symbol keys, etc.

It is an object of this invention to provide for a mouse control easily accessed with the thumb so the operator doesn't have to pick up his/her entire arm, and is able to stay in the described comfortable ergonomic position.

It is an object of this invention to lessen the reaches of the pinky fingers for lesser-used functions. The present invention provides an alternate use of the Escape key by making it easily accessed with the thumb and an alternative choice of using the thumb for the caps lock feature.

It is an object of the present invention to provide an alternative method for entering large quantities of numeric data on the regular keyboard with the least amount of finger movement. With this method, the user would slide his/her hands slightly up on the keyboard and position the "home fingers" over the number keys. The hands and wrists are kept in the same efficient position as when used for letter typing.

It is an object of the present invention to provide a keyboard which could also be used on a desk, turned around for non-touch typing.

It is an object of the present invention to provide keys shaped to accommodate reaches (differences in fingers from one person to another).

Further objects and advantages of my invention will become apparent from a consideration of the drawings and ensuing description.

| Reference Numerals in Drawings |
| --- |
| 12/12'-arms |
| 14-shoulder |
| 16-neck |
| 18/18'-forearms |
| 20/20'-hands |
| 22-front face |
| 24-back face |
| 26-power cord |
| 28-central processing unit |
| 30-conventional video display unit |
| 32/32'-padded portion of hand |
| 34/34'-wrist |
| 36/36'-sides |
| 38/38'-thumb |
| 40-function keys |
| 42-direction keys |
| 44-mouse/trackball control area |
| 46-special function keys |
| 48-special symbols keys |
| 50-conventional keyboard |
| 52-backspace |
| 54-enter key |
| 56-right shift key |
| 58-right-hand letter keys |
| 60-plus/equals key |
| 62-hyphen (subtraction)/underline key |
| 64-right-hand number keys |
| 66-decimal key |
| 68-divide key |
| 70-times key |
| 72-left-hand letter keys |
| 74-left shift |
| 76-tab key |
| 78-left-hand number keys |
| 80/80'-hand rest support |
| 81-keyboard surface portion |

-continued

Reference Numerals in Drawings 82-caps lock key
84/84'-space keys
86-escape key
88-alt key
90-control key
92-mouse/trackball control keys
94-mouse/trackball control pad
96-typical keypad keys
98-double zero key
100-zero key
102-flexible electronic sheet (back half)
104-connecting strips
106-flexible electronic sheet (front half)
108-electrical lines
110-electrical key connection points
112-power cord connection area
114-keyboard outside frame
116-curved internal frame structure
118-curved elliptical base Note: The same number is used with an apostrophe for the corresponding item on the right side. Arrows on lead lines point out an area or a group of keys.

SUMMARY

In accordance with the present invention, an ergonomic keyboard comprises a mounded structure which fits the natural position of the operator's hands. A hand rest area provides for the hands to rest on their sides while operating the unit. Keys on the back are arranged for convenient use of the touch method, while the space keys are under both thumbs, and all other keys on the front face are in clear view of the operator.

DESCRIPTION AND OPERATION

While my invention is susceptible to various modifications or alternative forms, specific embodiments of it are disclosed by example in the drawings. It should be understood, however, that this is not intended to limit the invention to the forms disclosed.

Figure 1:
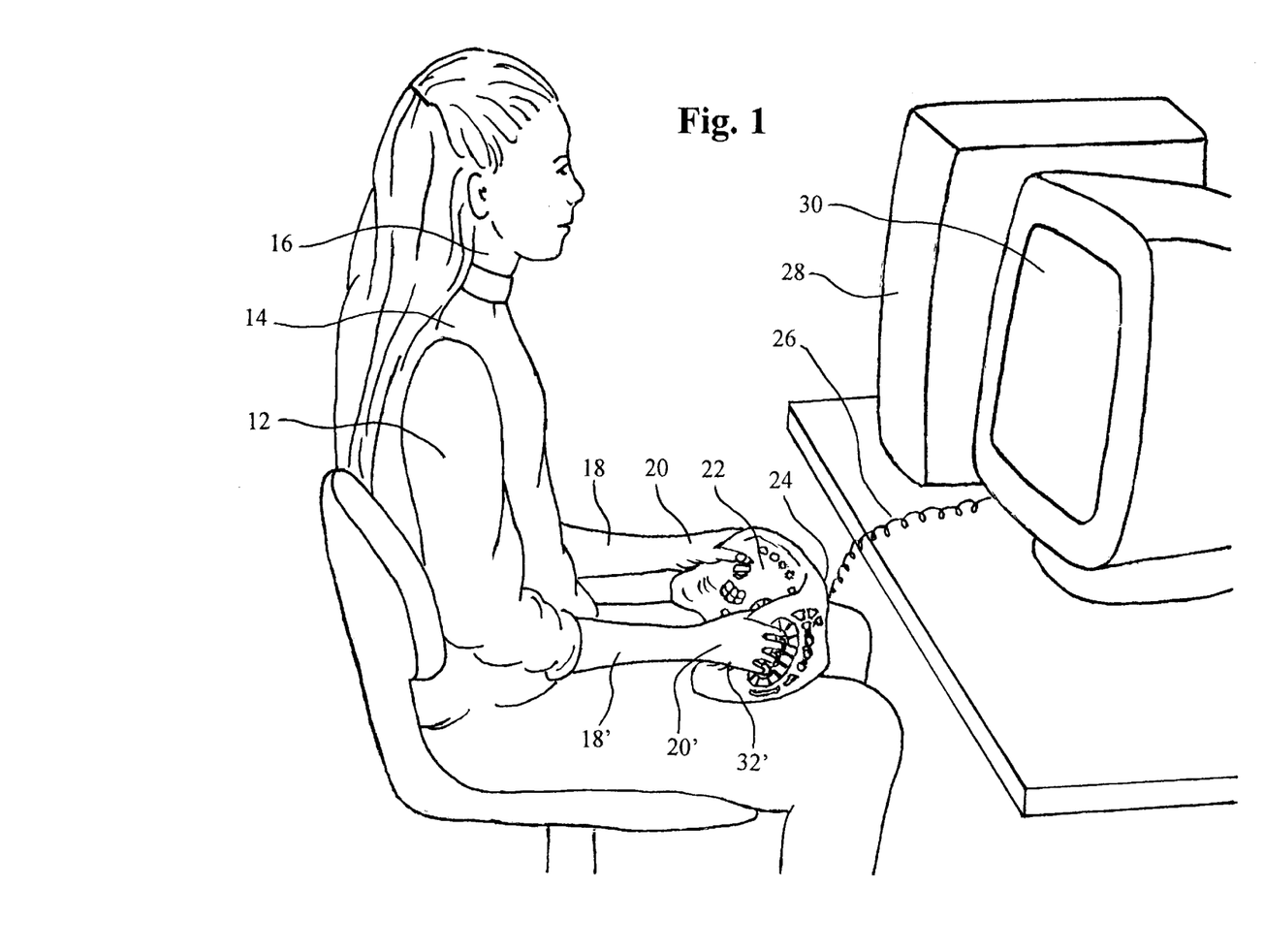
FIG. 1 shows the placement of the keyboard for optimum use, the posture of the operator, and the hand position for using the keyboard.

FIG. 1 shows the preferred use and embodiment of my invention, a keyboard apparatus which is in a mound shape and curved toward the operator. The back face 24 of the unit is convex, while the front face 22 is concave in nature. The invention is used typically with a conventional video display unit 30 and a central processing unit 28. The power may be remote or attached to the keyboard with a power cord 26 from the central processing unit 28.

As shown in FIG. 1, my ergonomic keyboard allows for the operator to rest the unit on his/her lap with arms 12/12' in a natural position down by the sides, and forearms 18/18' extending at a small downward angle from the horizontal plane. The weight of the hands 20/20', arms 12/12', and forearms 18/18' rests on the padded portion of the hand 32/32' opposite the thumb, at about shoulder width apart. Therefore, strain on the neck 16, shoulder 14, arm 12, and forearm 18 muscles is eliminated or greatly reduced.

Figure 2:
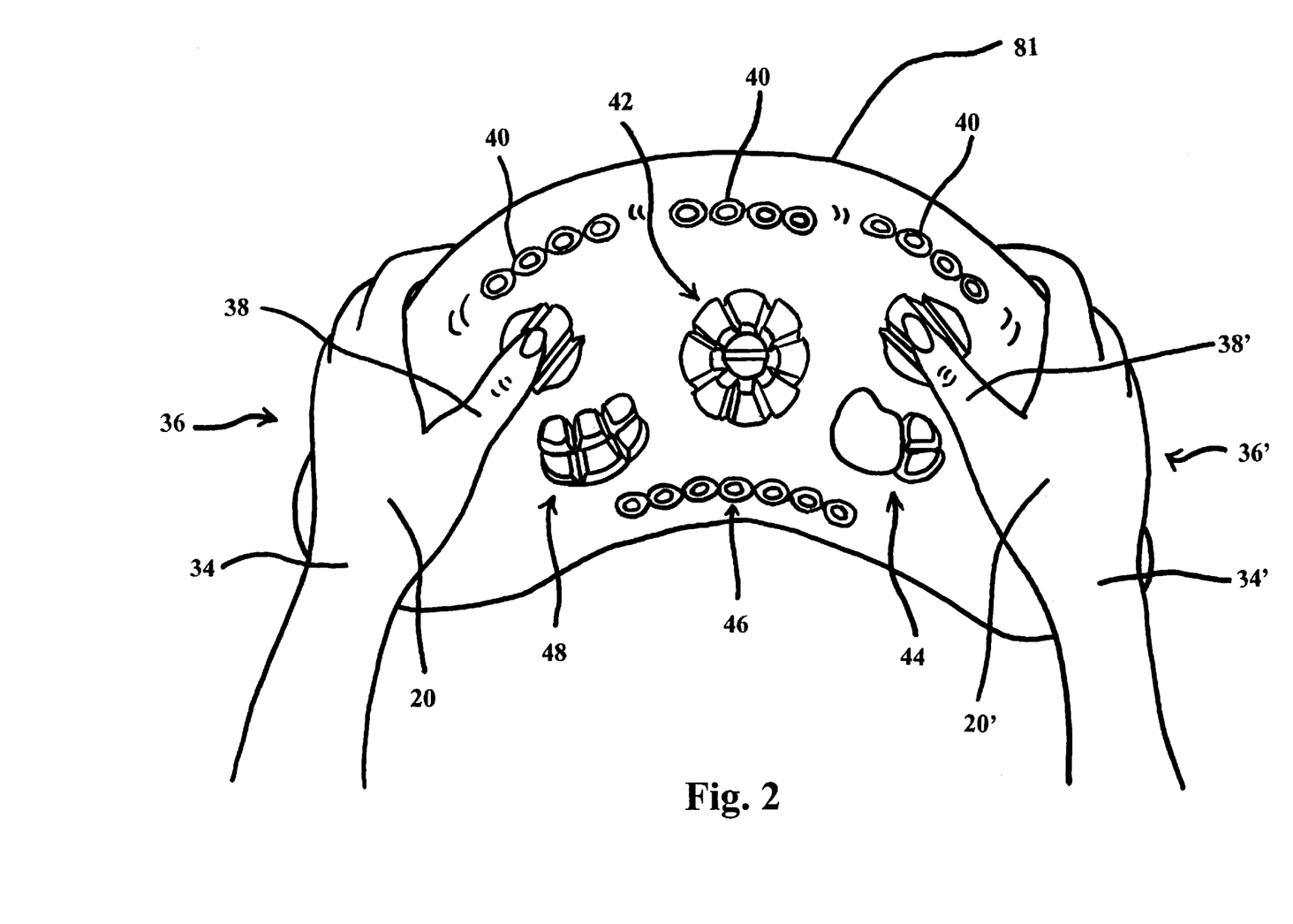
FIG. 2 is a basic diagram of the keyboard from the viewpoint of the operator. It also shows hand and wrist position of the operator.
Figure 6:
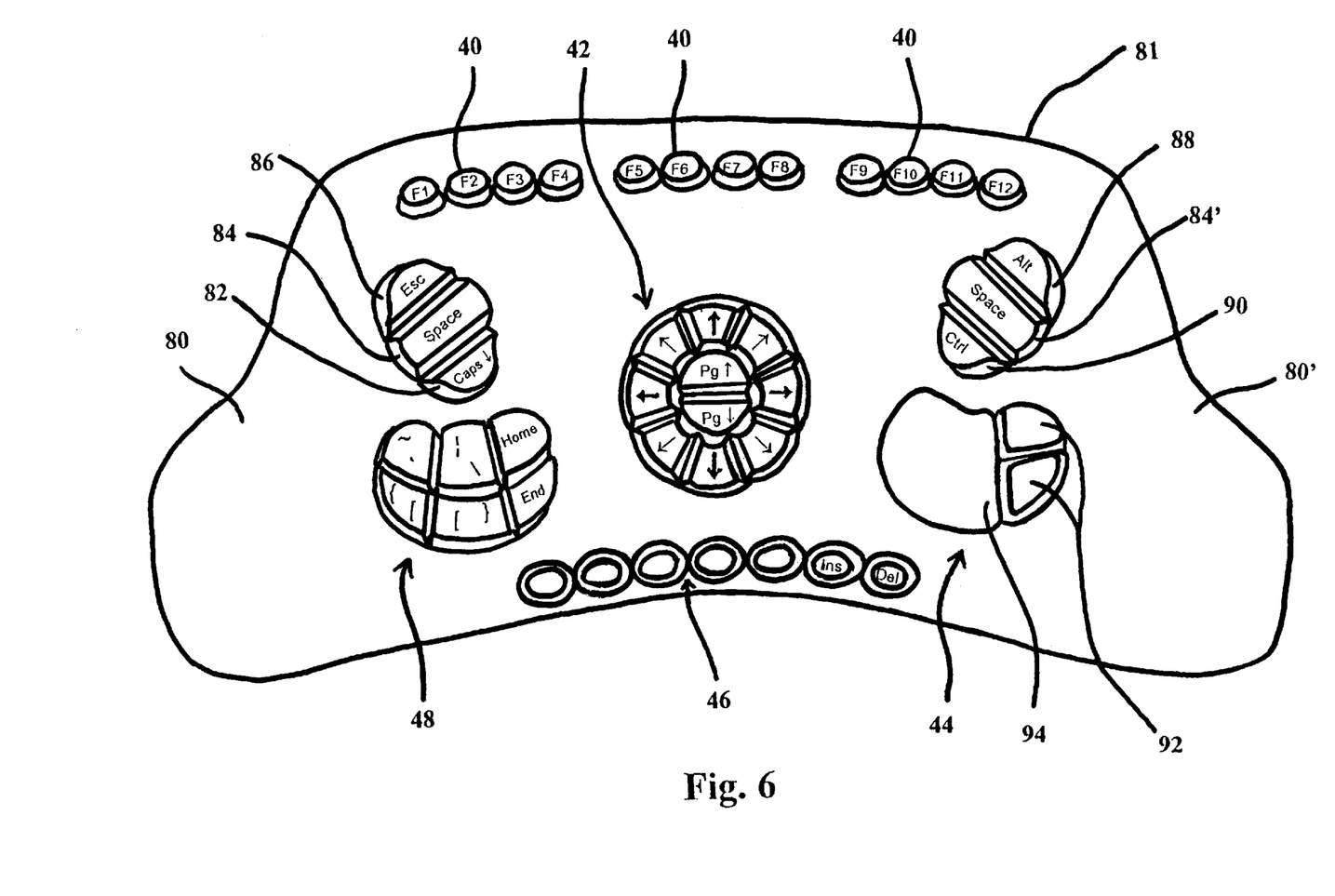
FIG. 6 is a full view of the front face of the invention showing key configuration and placement.

On the left and right sides (36/36'—FIG. 2) of the apparatus, the top of the mound shape dips down to provide an area for the hands 20/20' to rest and for the fingers to curve naturally around the structure. FIG. 6 best shows this hand rest support 80/80', whereas FIG. 2 shows the hands 20/20' at rest from the viewpoint of the operator. The thumbs 38/38' rest in a natural position, pointing inward and upward toward the middle/top of the device at about a 45° angle on the front face of the structure. The fingers curve over the left and right sides 36/36' to grasp the keyboard surface portion 81 and rest on the "home keys" on the back side of the keyboard surface portion 81. Because of my keyboard's ergonomic design, the wrists 34/34' have virtually no deviation from their natural position in front of the body, and do not need to be twisted inward to a horizontal plane, as is necessary with the conventional keyboard.

Figure 3:
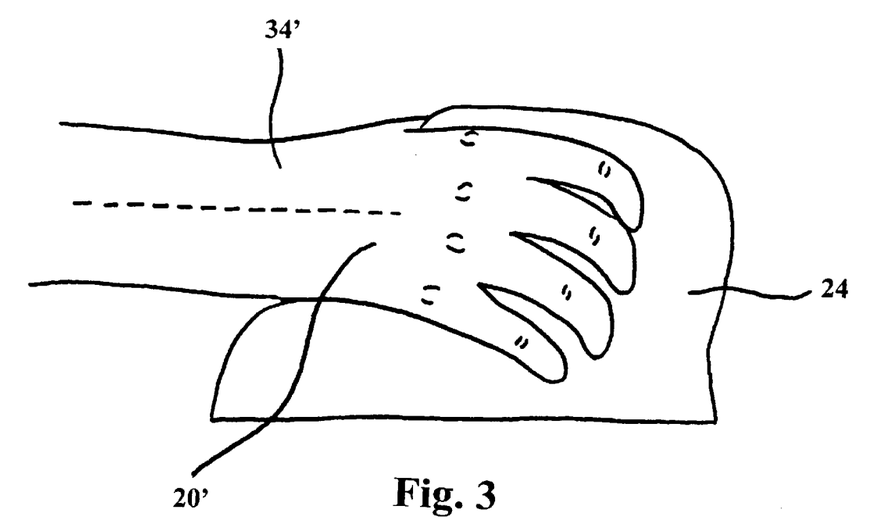
FIG. 3 shows the straight line formed by the wrist when using the proposed keyboard.
Figure 4:
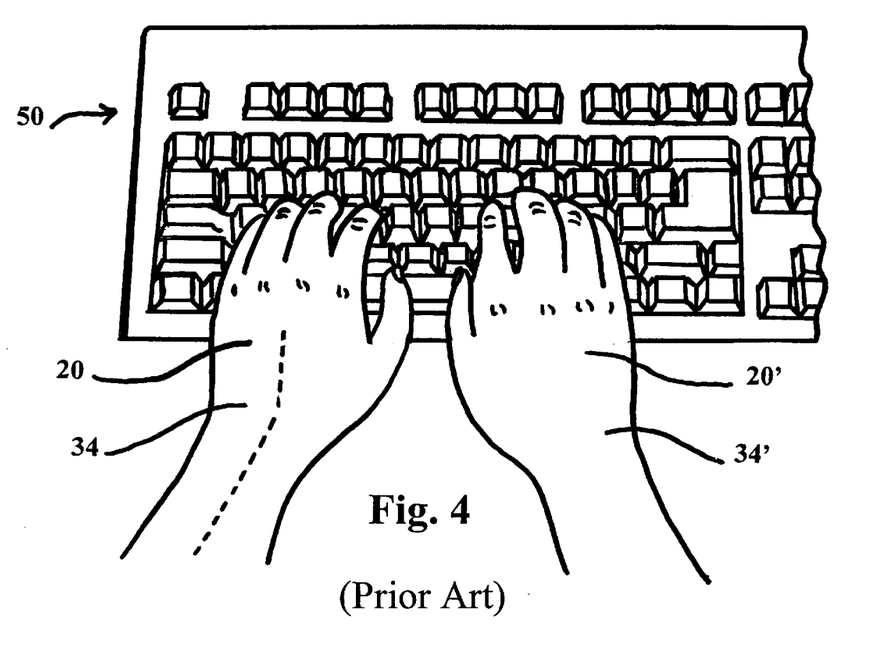
FIG. 4 (Prior Art) shows the angle of the wrists when using the conventional keyboard.

Taking a closer look at the position of the hands 20/20' and wrists 34/34' in FIGS. 3 and 4, it is shown that my keyboard provides for the wrists 34/34' to be straight, with absolutely no inward angling, whereas the unnatural angling of the wrists is necessary with the use of the conventional keyboard. Thus, with my keyboard, the strain on the median nerve of the wrist is minimized.

Figure 5:
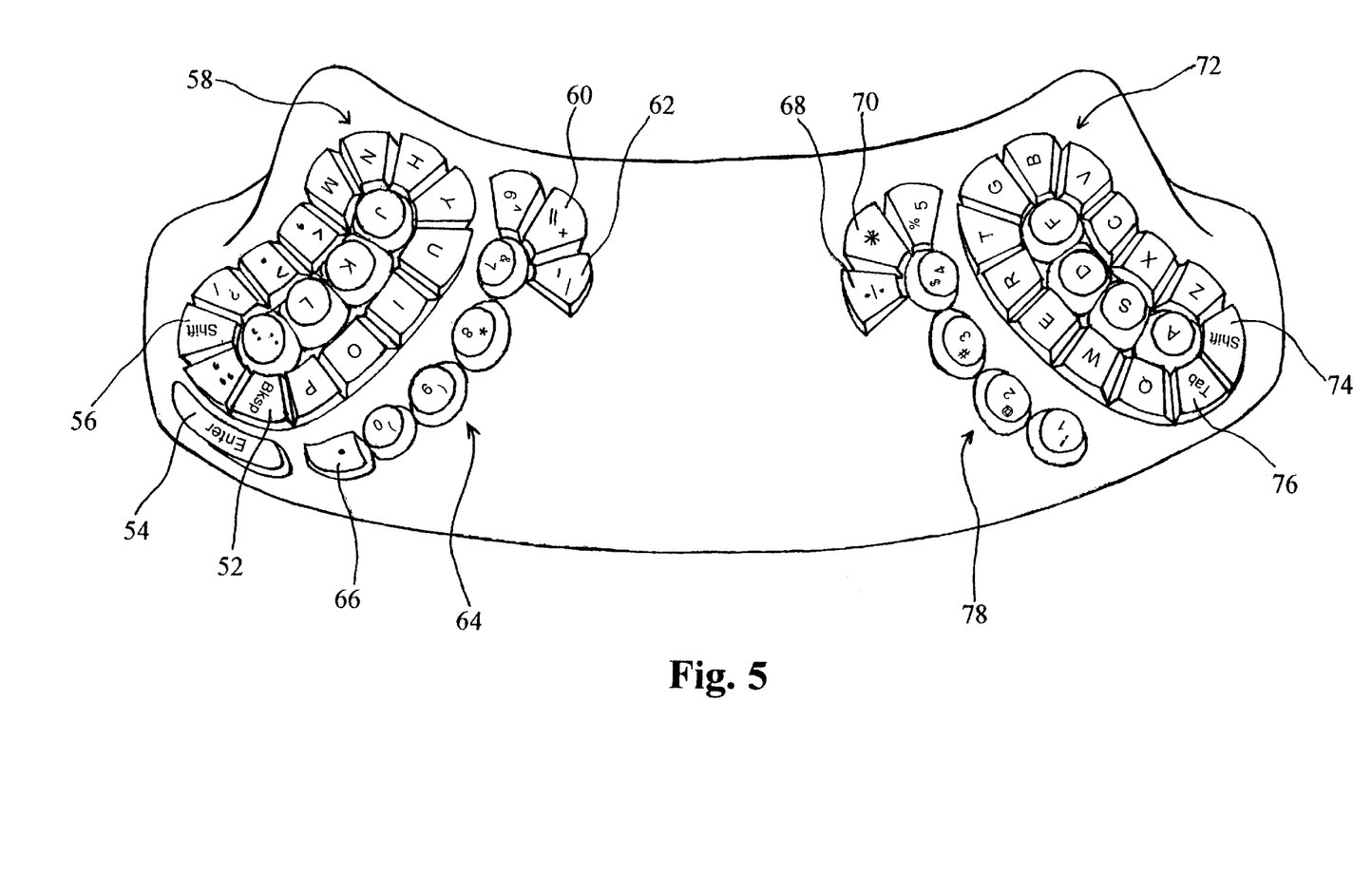
FIG. 5 is a full view of the back of the invention, showing key configuration and placement.

When using my keyboard, the fingers of the right hand rest over the home keys of the typical QWERTY keyboard letters (J, K, L, ;) and reach for the other right-hand letter keys 58 which are illustrated in FIG. 5. This section for the right-hand keys is positioned on the back of the device, with the keys arranged in a curved, elliptical configuration. This design provides for the curvature formed by the fingertips and allows the reaches from the home keys to be all about equal and minimal in distance. It is to be noted that the often-used backspace 52 and right shift 56 keys use the same conventional finger reaches, but are placed close to the home keys.

The right-hand number keys 64 and their corresponding symbols are positioned in a wide arch above the right-hand letter keys 58 in order to use the same reaches learned with the conventional keyboarding touch method. However, a plus/equals key 60 and a hyphen (subtraction)/underline key 62 are positioned near the "index-finger" end of the right-hand number keys 64. Also, a decimal key 66 is positioned near the "little-finger" end of the right-hand number keys 64. The arrangement of these 3 keys (60, 62, 66) allows for the operator to move his/her hand up to the number row ("home fingers" over the 7, 8, 9, 0) and use the numbers, numbers with decimals, and operations symbols with minimal reaches. An enter key 54 is curved and elongated to provide for its use both when the "home fingers" are in position over the letter keys or in the modified position, just described, over the numbers.

The fingers of the left hand rest over the home keys of the typical QWERTY keyboard letters (A, S, D, F) and reach for the other left-hand letter keys 72 which are also illustrated in FIG. 5. Similar to the right-hand section, the left-hand keys are positioned on the back of the device, with the keys arranged in a curved, elliptical configuration. Again, this design provides for the curvature formed by the fingertips and allows the reaches from the home keys to be all about equal and minimal in distance. The often-used tab 76 and left shift 74 keys use the same conventional finger reaches, but are placed closer to the home keys.

As with the right hand, the left-hand number keys 78 and their corresponding symbols are arched above the keys in order to use the same reaches learned with the conventional keyboarding touch method. However, additional times 70 and divide 68 keys are positioned near the "index-finger" end of the left-hand number keys 78. The arrangement of these 2 keys (68, 70) allows for the operator to move his/her hand up to the number row ("home fingers" over the 1, 2, 3, 4) and key numbers and operations symbols with minimal reaches.

In FIG. 6, the front view of my invention, it is shown that a much-used space key 84/84' is provided for use directly under either thumb. Also, an escape key 86 is conveniently located by reaching up with the left thumb, and a caps lock key 82, by reaching down with the left thumb. The alt 88 and control 90 keys are often used with today's software and are conveniently located and memorized with small reaches up and down respectively with the right thumb.

A mouse/trackball control area 44 is easily accessed with the right thumb without having to move the fingers off of the keyboard or even out of the "home" position, as is necessary with the use of a conventional keyboard and mouse. As shown in FIG. 6, two mouse/trackball control keys 92 are located to the right of a mouse/trackball control pad 94. These two keys correspond to the functions of the "left and right click" buttons on the conventional mouse.

In FIG. 6, the preferred embodiment of the invention shows the placement of the rest of the specialty keys in full visual access by the operator. This is because these keys do not have memorized reaches as part of the learned touch method of keyboarding. Function keys 40 are arranged in a row across the top of the keyboard following the same basic arrangement as that of the conventional keyboard. Direction keys 42 are conveniently arranged in the middle of the keyboard. Other special symbols 48, such as a Home key, End key, and brackets, are arranged to the left of the direction keys and below the left thumb keys in a manner which balances the design of the keyboard. Seven special function keys 46 are arranged in a line across the bottom of the keyboard for easy viewing and access. These keys may include special functions such as Insert, Delete, Print Screen, Scroll Lock, Pause/Break, or Windows® functions.

Figure 7:
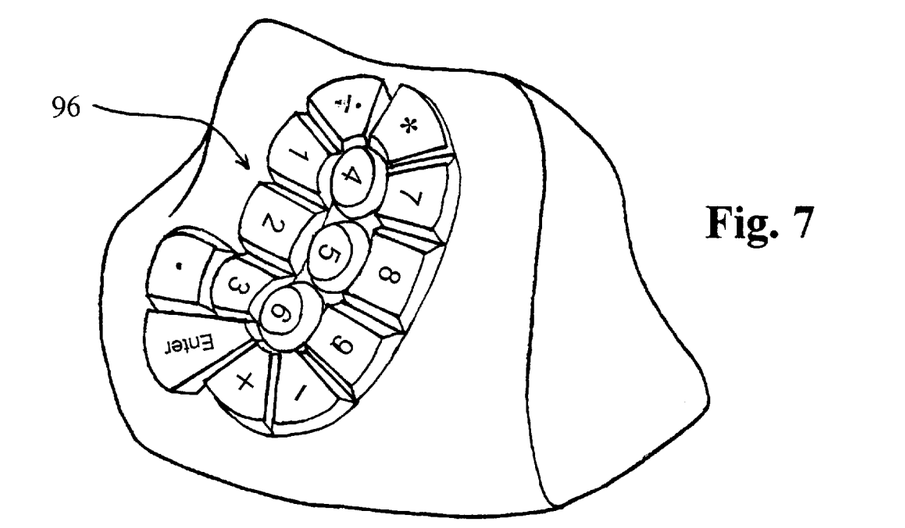
FIG. 7 shows the back of the numeric keypad, including key configuration and placement.
Figure 8:
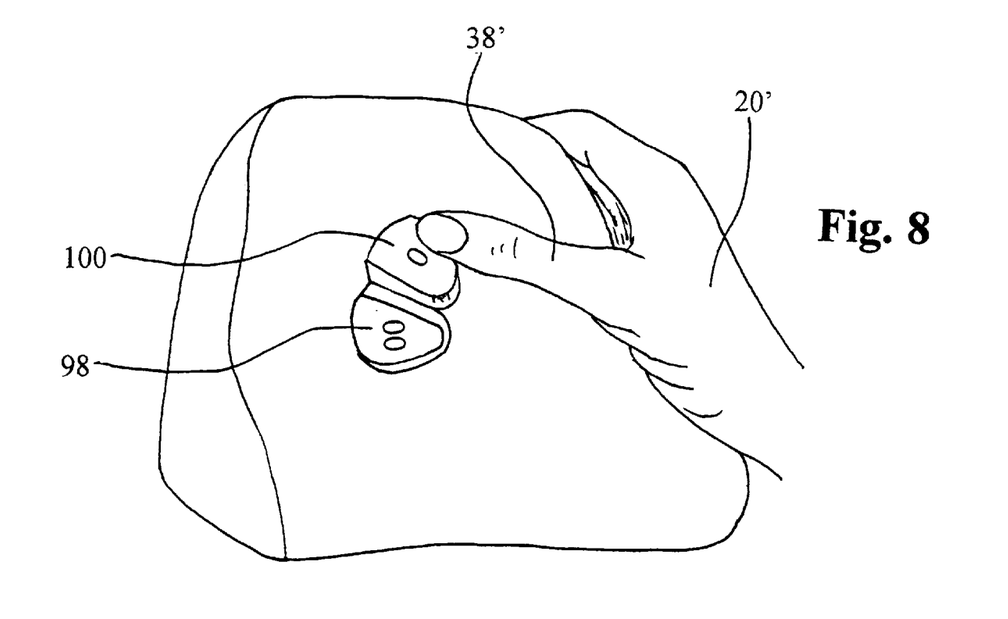
FIG. 8 shows the front of the numeric keypad, including the hand placement, key configuration, and key placement.

FIGS. 7 and 8 show the application of my invention in the embodiment of a separate or attachable keypad for numerical data entry. FIG. 8 shows the front view, with the hand 20' in the same resting position and the thumb 38' for activating a zero 100 and a double zero 98 key. FIG. 7 shows the preferred configuration for typical keypad keys 96 (numeric, decimal point, operations, and enter keys). With this configuration, the same touch method is used as the one taught for the conventional numeric keypad. However, the reaches are minimal due to the same curved elliptical configuration described for my ergonomic keyboard.

As with the traditional keyboard, the keys of the invention are depressed by the thumb or fingers in order to make electrical connections with another device such as the central processing unit 28. The action of pressing the keys makes an electrical connection through a key connection point and thus accomplishes the communication. With current traditional keyboards, this is typically done with a plastic sheet which contains electrical lines and connections. This sheet lies flat inside the keyboard unit.

Figure 9:
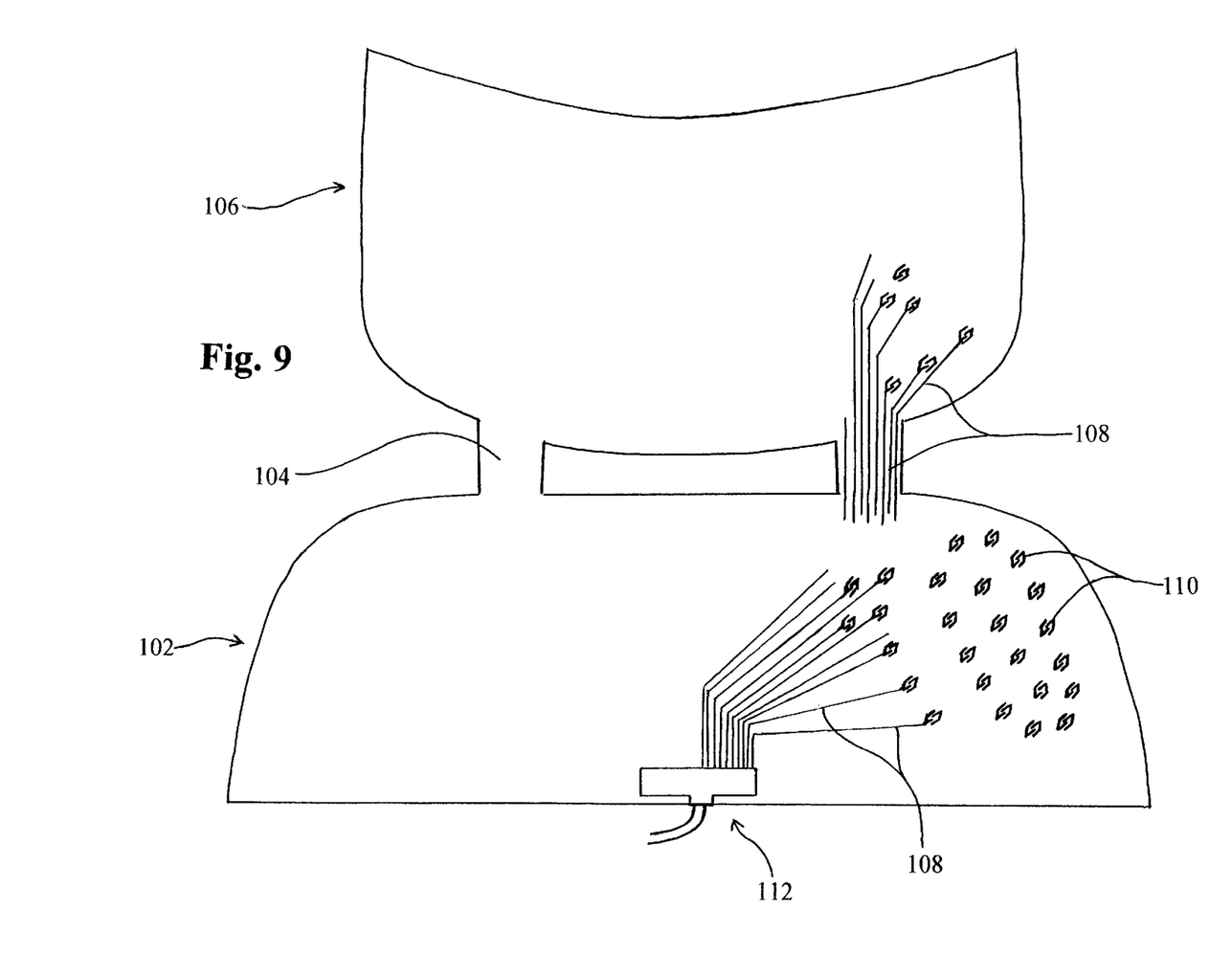
FIG. 9 shows the shape and partial electronic configuration for a flexible sheet, similar to those in current keyboards, which fits into the keyboard "housing" for making electronic connections when the keys are struck.

A method of adapting this same technology to the current invention is shown in FIG. 9. (It is not feasible to show detailed electrical features in the drawing, so a partial sample of these features is illustrated.) The flexible electronic sheet 102/104/106 has electrical key connection points 110 which correspond to the keys on the front and back of the unit. A front half 106 for the flexible electronic sheet is curved, and shaped and sized to match the front face 22 of the unit. Electrical key connection points 110 correspond to the keys for both the front and back face (22, 24) of the unit. A back half 102 for the flexible electronic sheet is shaped to match the back of the unit. A power cord connection area 112 is in the bottom, middle of the back half 102 of the sheet where connection is made with the external device such as the central processing unit. Two connecting strips 104 allow electrical lines 108 in the sheet to connect from the back to the front.

Figure 10:
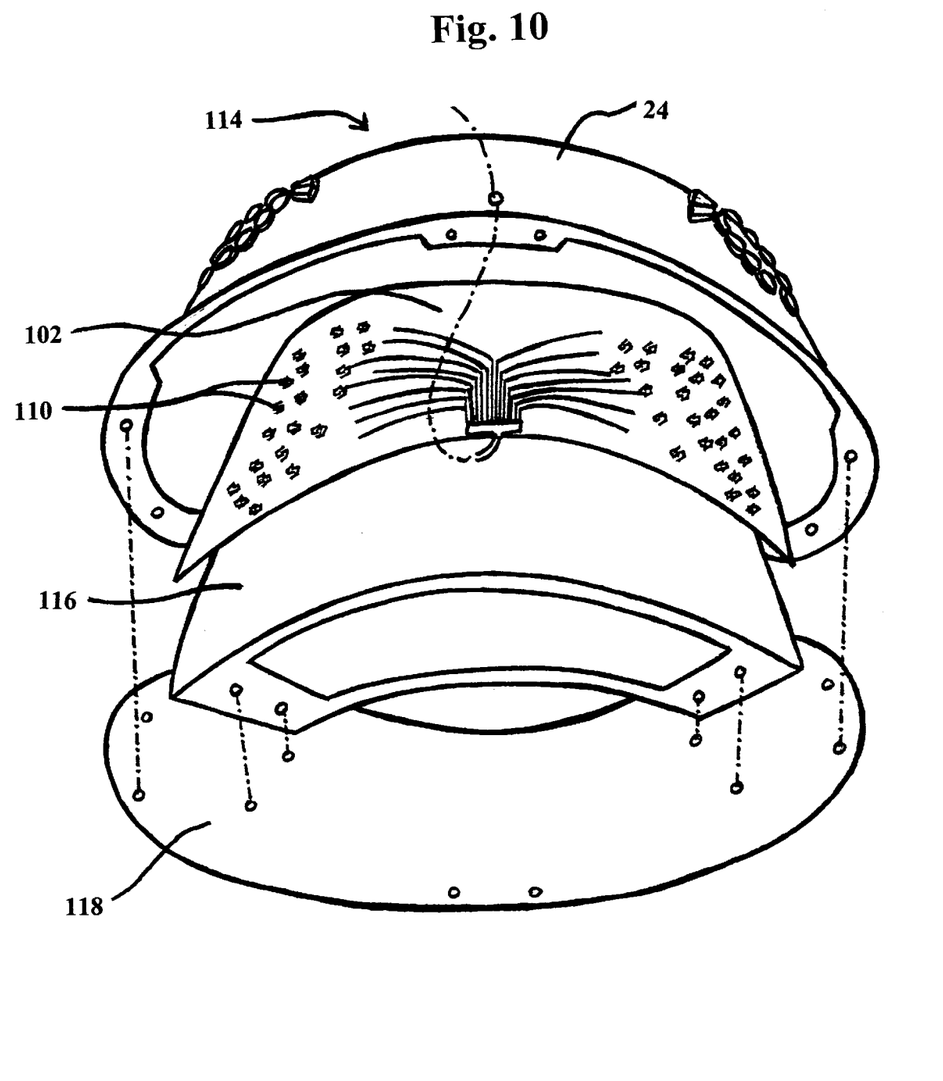
FIG. 10 shows an exploded view of one possible method for adapting a flexible electronic sheet and fitting the parts of the unit together.

The flexible nature of the electronic sheet 102/104/106 allows for it to be manufactured flat, then bent to be put into the curved ergonomic keyboard apparatus. FIG. 10 shows an exploded view of one method for accomplishing this task. A curved elliptical base 118 is shaped for the bottom of the device. An inside curved internal frame structure 116 attaches to the curved elliptical base 118 and serves as the framework to which the flexible electronic sheet 102/104/106 attaches. The keyboard outside frame 114 then fits over the top. When the keys are depressed, the curved internal frame structure 116 acts as a hard backdrop for the flexible electronic sheet 102/104/106 and the electrical connection at the key connection points 110 is made.

CONCLUSION, RAMIFICATIONS, AND SCOPE

Thus, the reader will see that my curved mound ergonomic keyboard invention provides considerably more comfort and is convenient to use. Furthermore, the ergonomic keyboard has the additional advantages in that:

- it provides for the touch method used with common QWERTY keyboard arrangement.
- it permits the user to rest his/her hands on the keyboard in such a way that it doesn't interfere with the movement of the muscles and tendons of the fingers or wrists.
- it is easy to manufacture.
- it allows for the fingers and thumbs to move in a natural direction.
- it allows for differences in finger length.
- it allows for easy adaptations of current methods for creating electronic connections for the internal keyboard.
- it provides for good visualization and easy access for the lesser-used keys.
- it provides for a convenient mouse control area.
- it provides an alternative method for numeric data entry.
- it allows for its use on the operator's lap or on a desktop.

Although the above Description and Operation section contains many specifities, these should not be construed as limiting the scope of the invention but as merely providing illustrations of some of the presently preferred embodiments of this invention.

For example, the unit may be attached with a power cord or be remote (without power cord). It could be of any color or even transparent to view the inner workings. Though the structure would need to be made from mainly hard, durable material, such as plastic, parts of it could be soft or even slightly "moldable" such as the area where the hands rest. The hand rest areas might also be extended.

To make the product more salable, it may be produced in a variety of sizes (such as small, medium, or large). The middle of the front face may have a different structural nature. It may have portions curving or protruding outward and may have different key configurations and shapes, because this portion of the unit isn't affected by the positioning and reaching of the hands and fingers for the commonly-used keys.

In fact, another embodiment of the unit could be split in the middle and made into two halves, yet would keep the same ergonomic design for the entire hand area. A sample of this is shown in FIG. 8, which shows how the ergonomic design can be applied to another device, namely a keypad for data entry. The unique, ergonomic shape provides for a variety of improved keyboard operations. Therefore, the present invention may easily be adapted for use in a variety of input devices. The scope of my invention is to include all input devices such as a keyboard, keypad, court reporting machine, etc.

The bottom of the keyboard need not be flat, but may be shaped to fit over the operator's legs. It may even be created with an attachable device which could be shaped to fit over the operator's legs or made of soft or moldable materials for comfort on the lap, and/or to help the unit grip better.

My description refers to a specific embodiment of the present invention when used as a QWERTY format keyboard input device. However, the device may be used with other keyboard formats such as Dvorak and others which may be used for data entry.

The shape, size, or material of the keys may vary. For example, the tops of the keys may dip down to accommodate for the curves of the fingertips. The tab key, shift keys, or backspace keys may be elongated to extend further out from the group of keys. The space bar keys may be longer, round, or different from the illustrated shape. The enter key may also differ in size or shape.

The arrangement of the keys on the front face may vary, except for the space keys under the thumbs. Keys which are in place for use of the alternative method for striking numbers (moving hands up so fingers are on new number "home keys") may be eliminated. The mouse control area may be a separate feature rather than attached.

The example shown for making electrical connections inside of the keyboard unit is only one method. The unit is adaptable to any other method of creating internal electrical connections. The possible arrangements for the electrical connections is endless, and the internal framework may vary to accommodate the outside frame.

In my illustrations, one method was shown for putting the unit together. There are many other adaptable methods. For example, electrical "lines" could connect directly to the backs of the keys, being held in place with some sort of brackets, thus eliminating the need for the electronic sheet and inside frame; or electrical connections could be made directly on an "electronic sheet" made of hard material, so the need for an inside frame structure would be eliminated.

Various modifications or improvements to the current invention might include a device which flips out from the back of the unit to hold a sheet of paper. The invention is to cover all modifications, equivalents, and alternatives falling within the scope and spirit of the invention as defined by the claims.

I claim:

1. A data entry device comprising:
   a) a substantially horizontal hand rest support on left and right sides for supporting an operator's hands on their sides; and
   b) a keyboard surface portion mounded upward from and between said hand rest supports, extending in a substantially vertical plane, and having a back face, and a front face and hand support means, said back face including a plurality of often-used keys out of sight from the operator, and said front face containing a plurality of lesser-used keys facing the operator;
   said hand support means for guiding and supporting, the bottom surface of the operator's wrists to create an angle of at least 30° but no more than 90° with said hand rest supports, and the operator's hands clutch said keyboard surface portion in a natural position for striking the keys.

2. A data entry device according to claim 1, whereas said keyboard surface portion is split into two halves.

3. A data entry device according to claim 1, whereas said back face of said keyboard surface portion is convex and said front face of said keyboard surface portion is concave.

4. A data entry device according to claim 1, further including a substantially elongated and curved enter key positioned midway between "home" keys and numeric keys located on said back face, whereby allowing an operator to access said enter key when "home" fingers are positioned over said alphabetic keys and when "home" fingers are positioned over said numeric keys.

5. An ergonomic data entry device comprising:
   a) a unitary frame having a convexly curved back surface; and
   b) a substantially horizontal hand rest support on left and right sides of said unitary frame for supporting an operator's hands on their sides;
   c) a keyboard surface portion, graspable by two hands of a user, mounded up between and adjacent to said hand rest supports, extending in a substantially vertical plane, and having a convex back face including a plurality of often-used keys and a front face including a plurality of lesser-used keys facing the operator; and
   d) a hand support means for guiding and supporting the operator's wrists to create an angle of at least 30 but no more than 90 with said hand rest supports, and the operator's hands clutch said keyboard surface portion in a natural position for striking the keys.

* * * * *